United States Patent [19]

Bosisio et al.

[11] Patent Number: 4,994,632

[45] Date of Patent: Feb. 19, 1991

[54] ELECTRIC CABLE WITH LAMINATED TAPE INSULATION

[75] Inventors: Claudio Bosisio, Brembate Sotto; Antonio Campana, Milan, both of Italy

[73] Assignee: Societa' Cavi Pirelli S.p.A., Milan, Italy

[21] Appl. No.: 424,052

[22] Filed: Oct. 19, 1989

[30] Foreign Application Priority Data

Oct. 21, 1988 [IT] Italy .............................. 22397 A/88

[51] Int. Cl.[5] ........................ H01B 7/02; H01B 9/06; B32B 23/08; B32B 33/00

[52] U.S. Cl. ................................ 174/121 R; 156/52; 156/53; 156/272.2; 174/25 R; 174/26 R; 174/120 FP; 174/121 SR; 428/526; 428/537.5

[58] Field of Search ................ 174/25 R, 25 G, 26 R, 174/26 G, 120 FP, 121 R, 121 B, 121 SR; 428/526, 537.5; 156/52, 53, 272.2

[56] References Cited

U.S. PATENT DOCUMENTS

| | | | |
|---|---|---|---|
| 3,078,333 | 2/1963 | Kang | 174/121 R |
| 3,194,872 | 7/1965 | Garner | 174/25 R |
| 3,749,812 | 7/1973 | Reynolds et al. | 174/121 B X |
| 3,775,549 | 11/1973 | Matsuda et al. | 174/25 R |
| 4,237,334 | 12/1980 | Kojima et al. | 174/120 FP X |
| 4,560,603 | 12/1985 | Giacomel | 156/272.2 |
| 4,571,357 | 2/1986 | Hata et al. | 174/25 R X |
| 4,602,121 | 7/1986 | Priaroggia | 174/26 R X |
| 4,853,490 | 8/1989 | Bosisio | 174/121 B X |
| 4,859,804 | 8/1989 | Hata et al. | 174/120 FP X |

*Primary Examiner*—Morris H. Nimmo
*Attorney, Agent, or Firm*—Brooks Haidt Haffner & Delahunty

[57] ABSTRACT

A paper-polymeric material, laminated tape, an electric cable insulated with such tape and a method of making the tape. The tape includes a film of polymeric material to at least one surface of which a paper tape comprising cellulose fibers is bonded by contacting the paper tape at room temperature with the film heated to a temperature above its melting temperature. Prior to contacting the paper tape with the heated film, fibrils are caused to project from at least one surface of the paper tape by subjecting it to a high voltage, electrostatic field. In the laminated tape, the fibrils are embedded in the material of the film to provide an improved bond between the film and the paper tape.

13 Claims, 1 Drawing Sheet

ELECTRIC CABLE WITH LAMINATED TAPE INSULATION

The present invention relates to single-core and multi-core electric cables of the type in which the conductors are surrounded by a layered insulation impregnated with an insulating fluid.

In the present specification, the term insulating fluid is intended to mean not only insulating fluid oils, but also high viscosity insulating oils and compounds.

Examples of the cables to which the present invention relates are oil-filled cables, so-called "pipe" cables and cables having a layered insulation impregnated with insulating compounds accompanied by a gas under pressure.

More particularly, the present invention relates to cables of the type summarized hereinbefore in which the layered insulation is formed at least partially by turns of at least a laminated tape, the term "laminated tape" meaning a tape formed by at least a thin layer of paper, which is at least partially formed by a cellulose material and which is paired with and bonded to a polymeric material film.

In general, it is known that the cables provided with a layered insulation formed with laminated tapes have a better electrical performance in terms of reduced dielectric losses and a greater dielectric strength than those of cables having a layered insulation formed only by paper tapes.

It is also known that the cables provided with a layered insulation formed by laminated tapes have greater risks of service failure than the cables having layered insulation formed only by paper tapes.

The greater risks referred to hereinbefore are those due to the danger of encountering an alteration of the correct structure of the layered insulation during the manufacturing and the laying of the cable in case detachments should occur between the components of the laminated tape, i.e. in case of partial separations between the thin paper layer and the polymeric material film. This results because either the thin paper layer or the polymeric material film taken individually have a mechanical resistance, in particular, a modulus of elasticity, lower than that of a laminated tape formed with them.

During the bendings to which a cable is unavoidably subject during the manufacturing and the laying, bending stresses arise in the layered insulation of the cable. Said bending stresses cause relative sliding movements between the various layers forming the layered insulation of the cable and generally are not dangerous for the laminated tapes as a whole. However, due to the lower mechanical resistance of the tape components, such bending stresses can produce curlings, foldings, dislocations and breakage in the elements forming the laminated tape when said components are not bonded together.

One of the causes of weakening of the bond between the thin thin layer and the polymeric material film which, consequently, acts so as to facilitate the separation between said components, is the one described hereinafter.

As a practical matter, all the polymeric materials used for laminated tapes swell when put into contact with the known insulating fluids for cables. Consequently, when a polymeric material film is immersed in an insulating fluid for cables, the swelling of the film causes an increasing of its dimensions.

On the other hand, the cellulose paper does not incur any swelling in contact with the known insulating fluids for cables. Therefore, a paper tape or a thin paper layer does not modify its dimensions when immersed in a known insulatinq fluid for cables.

It follows that when a laminate formed by at least a thin cellulose paper layer and a plastic material film is immersed in a known insulating fluid for cables, there is a relative variation of dimensions between its components, the effect of which is that the existing mutual bond is weakened because such relative variation of dimensions produces forces in the bonding zone acting in such a way as to produce a relative sliding movement between the components forming the laminate.

A known proposal, intended not only to avoid the weakening of the bond between the thin paper layer and the polymeric material film in a laminate but also to improve the bonding between said components, is described in the U.S. Pat. No. 3,749,812.

Said proposal is that a laminate in which the bonding between the paper thin layer and the polymeric material film is obtained by pairing, during the laminate manufacture, the thin paper layer at room temperature with the polymeric material film in the melted state and at a temperature of about 300° C., namely, at a temperature which is nearly twice the melting temperature of the polymeric material.

By means of the laminate according to said U.S. patent, which is known to those skilled in the art by the names "pre-stressed" laminate or "extrusion bonded" laminate, it is possible to oppose the swelling effects of the polymeric material film which adversely affect the bonding existing between the components of the laminate. In fact, in the so-called "pre-stressed" or "extrusion bonded" laminates, before they are placed in contact with the cable insulating fluid, the polymeric material film is in a state of tensile stress due to the particular manner by which the laminate has been manufactured.

In fact, since the pairing and bonding between the thin paper layer and the polymeric material film has been made with the thin paper layer at a room temperature (therefore not subjected to any thermal expansion) and with the polymeric material film in the melted state and at a temperature which is about twice the melting temperature of the polymeric material of the film, a film is in a thermally expanded condition whereas the paper layer is not significantly expanded.

During the cooling that follows the pairing and bonding operation of the thin paper layer to the polymeric material film, the thermal contraction of the film is prevented by the bonding that it has with the thin paper layer.

It follows that, after the cooling, the film is maintained in an elastically elongated state by the thin paper layer.

The swelling of the polymeric material film, which takes place by placing the laminate in contact with an insulating fluid for cables and which produces therein an expansion of dimensions, acts in practice in such a way as to put the laminate under the condition of no stress.

A laminate of "pre-stressed" type permits the reduction, to a certain extent, of the risk of detachment between the components of a laminate and, therefore, the risk of separation of the cable layered insulations for the reasons set forth and for the fact that the bonding between the thin paper layer and the polymeric material film, being carried out while this latter is in the melted state and at high temperature, permits a good mechanical connection between such components.

An object of the present invention is that of providing cables having a layered insulation, formed also only in part by turns of laminated tapes and, in particular, a laminate of the "pre-stressed" or "extrusion-bonded" type, in which the risk of separation of said layered insulation in consequence of detachment between the components of the laminate is less than that existing in the known cables without causing any alteration of the dielectric characteristics of the laminate and the chemico-physical characteristics of the laminate components and consequently, without altering adversely any characteristic of the cable.

In accordance with the present invention, an electric cable comprises, inside a sheath, at least a conductor surrounded by a layered insulation impregnated with an insulating fluid, at least a layer of said layered insulation formed by a turn of a tape of a laminate comprising at least a thin paper layer paired with and bonded to a polymeric material film, said laminate being of the type in which the bonding between the thin paper layer and the polymeric material film is obtained by pairing the thin paper layer at room temperature with the polymeric material film while this latter is in the melted state and at a temperature in the range between 200° C. and 320° C., said cable being characterized by the fact that the fibrils of the cellulose fibers which project from the surface of the thin paper layer are embedded in the polymeric material of such film.

In particular, for a cable according to the invention, in any section of the laminate perpendicular to its faces, the number of fibrils of the cellulose fibers projecting from the surface of the thin paper layer and embedded in the polymeric material film are not less than 100 per millimeter of length of the section.

Other objects and advantages of the present invention will be apparent from the following detailed description of the presently preferred embodiments thereof, which description should be considered in conjunction with the accompanying drawings in which.

Figure 1:
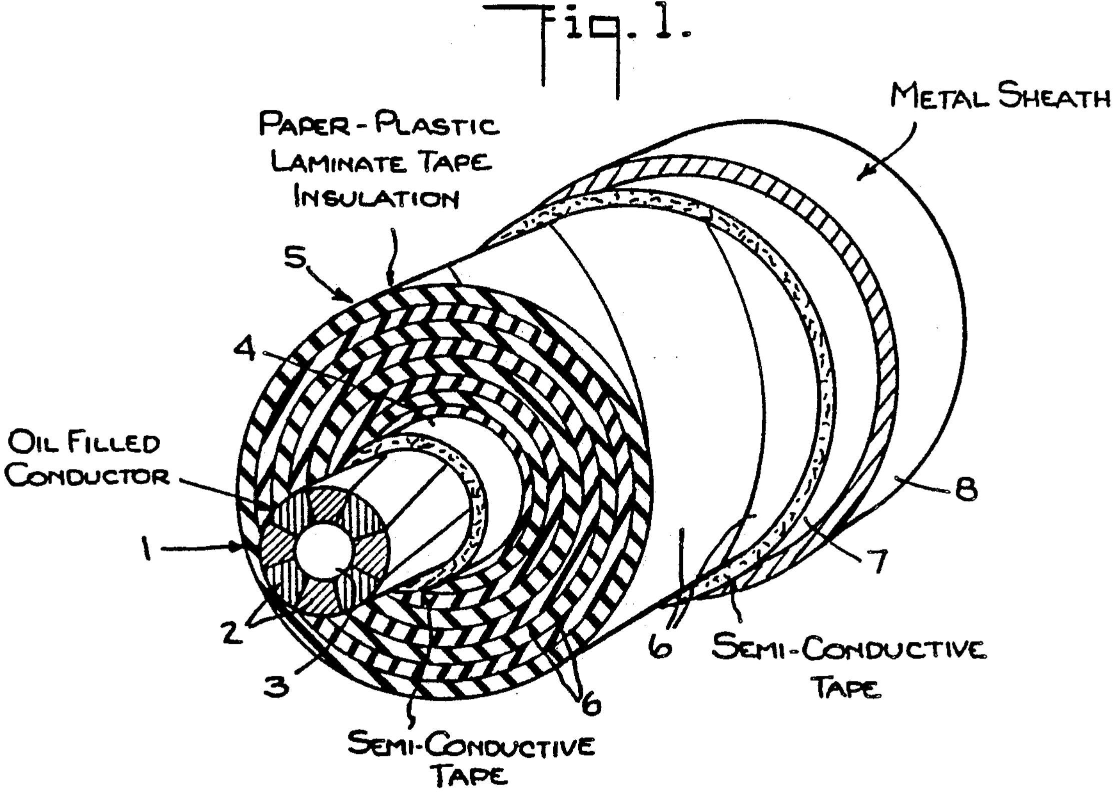
FIG. 1 is a perspective view of a length of a cable according to the invention with parts removed stepwise for showing its structure.

The cable shown in FIG. 1 is a single core, oil-filled cable according to the invention, the structure of which will be described hereinafter.

The cable comprises an electrical conductor 1 formed by a plurality of keystone-shaped conductors 2, for instance, of copper, having a duct 3 for the longitudinal movement of the cable insulating fluid oil, for instance, decylbenzene.

The electrical conductor 1 is encircled by a semi-conductive layer 4 formed, for example, by turns of semi-conductive tape, e.g. cellulose paper loaded with semi-conductive carbon black.

Around the semi-conductive layer 4, there is a layered insulation 5 formed by turns of laminated tapes 6 described hereinafter.

Around the layered insulation 5, there is provided a semiconductive layer 7, the structure of which is the same as that of the semi-conductive layer 4 previously described.

A metal sheath 8, for example, of lead, surrounds all the previously described elements of the cable, and any space inside said sheath 8 is filled with the insulating fluid oil of the cable which also impregnates the layered insulation 5.

Figure 2:
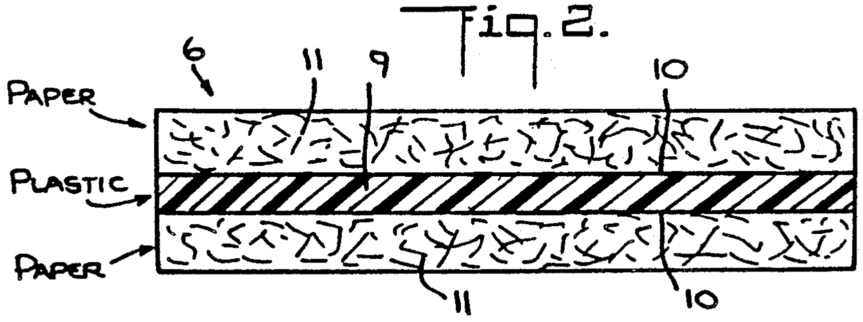
FIG. 2 is an enlarged section of a laminated tape forming the layered insulation of the cable shown in FIG. 1.

As previously stated, the layered insulation 5 is formed by turns of laminated tapes 6, the characteristics of which are set forth hereinafter and the section of which is shown in FIG. 2.

As shown in FIG. 2, the laminate comprises a film 9 of a polymeric material, e.g. a polyolefine, such as polypropylene, at the faces 10 of which a plurality of thin layers 11 of paper, i.e. cellulose paper, are applied and bonded Of course, other polymeric materials known in the art can be used.

The laminate 6 is of the type known as "pre-stressed" or "extrusion bonded" laminate since, during the manufacturing of the laminate the two thin paper layers 11, both at room temperature, have been contacted with the film 9 of polymeric material while this latter is in the melted state and at a temperature in the range from 200° C. to 320° C., i.e. at a temperature much higher than the melting temperature of the polymeric film.

Figure 3:
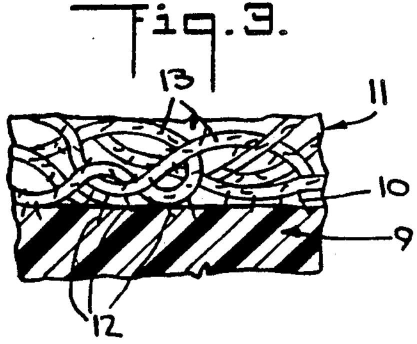
FIG. 3 is a fragmentary section, on a scale larger than that of FIG. 2, of the laminate shown in FIG. 2.

For the cable according to the invention, an essential characteristic which a laminated tape forming the layered insulation of the conductor must possess, is the one which is described hereinafter and which is schematically shown in FIG. 3.

At the contacting surface 10 between the thin paper layers 11 and the film 9 of polymeric material, a plurality of fibrils 12 of other cellulose fibers 13, and specifically, fibrils 12 extending from the cellulose fibers 13 present on the surface 10 of the thin layer 11 facing the turn 9, are embedded in the polymeric material of said film 9.

In any section of the laminate perpendicular to its faces, the number of fibrils per millimeter of length of the section preferably is not less than 100.

A laminate having the essential characteristic, for the purposes of the present invention, except for the embedded fibrils, can be obtained by using the method and apparatus by which the so-called "pre-stressed" or "extrusion bonded" laminates are manufactured at present, and therefore, it is not necessary to describe them since they are known per se.

The difference between the prior art method and the method for producing the laminate of the invention is that the thin paper layer 11, before being placed in contact with the film 9 of polymeric material melted at the previously described high temperatures, is subjected to an electrostatic field at high voltage, for example, at 18 KV with a frequency of 10 KHz, which is able to cause the orientation of the cellulose fibrils existing on the surface of the thin paper layer so that said fibrils are substantially perpendicular to such surface of the thin paper layer.

In fact, the so-oriented fibrils can easily penetrate into the polymeric material of the film during its pairing with the thin paper layers because of the flowability of the polymeric material at the high temperature to which it is heated during the laminating operation.

A cable provided with insulation of the structure disclosed has, with respect to the known cables, less risk of separation of its components since the bonding between the components of the laminate is considerably better as compared to that of the laminates of the known cables which do not have fibrils of the paper layer embedded in the film of polymeric material.

In a cable according to the invention, the reduction of the risk of separation of the layered insulation is achieved through a better bonding between the components of the laminate forming said layered insulation without prejudicing any other characteristic of the cable.

Experimental tests, which will now be described, demonstrate the better bonding existing between the components of a laminate forming the insulation of a cable according to the invention with respect to the laminates forming the layered insulation of the known cables.

The laminate of the layered insulation of a cable according to the present invention has been subjected to the experimental test, which will be explained hereinafter, in order to determine the extent of the bonding between the components of said laminate and specifically, between the thin paper layer and the polymeric material film as set forth hereinafter.

The laminate was prepared with a polymeric material film having a thickness of 60 microns, and the polymeric material was polypropylene having a density of 0.9 g/cm$^3$ and an index of flowability (melt flow index), determined according to the standards ASTM D 1238-82, of 35 g/10 minutes at 230° C.

Thin cellulose paper layers having a thickness of 30 microns and the following characteristics were applied on both faces of the propylene film.

Each thin paper layer was wholly formed by a cellulose material having a density of 0.70 g/cm$^3$ and an impermeability of 200 Gurley seconds. Moreover, in the longitudinal direction of the laminate each thin paper layer had an ultimate tensile stress of 155 N/mm$^2$ and an elongation of 2% while, in the cross direction, the ultimate tensile stress was 55 N/mm$^2$ and the elongation was 6.5%.

The bonding of the above said thin paper layers to the polypropylene film was carried out by contacting the thin paper layers, having a temperature of 25° C. with the opposite faces of the polypropylene film while the film was at a temperature of 300° C.

Before the contacting step, the thin paper layers were subjected to the action of an electrostatic field by passing them between two electrodes to which an alternating voltage of 18 KV with a frequency of 10 KHz was applied.

Sections of the laminate prepared as set forth, and taken in planes perpendicular to its major faces, have been examined with an electron microscope.

By means of said examination, made at magnification of 3000 ×, it has been found that in any section of the laminate, there was an average of two fibrils of the cellulose fibers per 100 microns of length of the section projecting from the thin paper layer and embedded in the polypropylene film which corresponds to 200 fibrils per millimeter of length of the laminate section.

The laminate of the layered insulation of a known cable used in the experimental tests for comparison purposes differs from that of the present invention only in that the thin paper layers have not been subject to any treatment before being bonded to the polypropylene film. The thicknesses, materials and characteristics of the material forming the comparison laminate were the same as those of the laminate of a cable according to the present invention.

In the laminate of a known cable, the sections perpendicular to the faces of the laminate itself, examined with an electron microscope at a magnification of 3000 × did not show the presence of fibrils of cellulose fibers projecting from the thin paper layers and embedded in the polymeric material of the film.

The experimental test used to determine the extent of the bonding between the components of a laminate of a cable according to the invention and those of a laminate of a known cable was the test known as the "peeling strength" test and said test was carried out with a dynamometer identified as INSTRON 1122.

The specimens prepared for the test consisted of rectangular segments of laminate having a width of 15 mm and a length of 100 mm.

The minimum force per centimeter of width of the specimen necessary to cause the detachment of a thin paper layer from the polypropylene film was determined on the specimens of laminate introduced into said dynamometer identified as INSTRON 1122.

The test has been carried out both on the specimens of laminates not impregnated with an insulating fluid for cables and on specimens of laminates impregnated with an insulating fluid for cables, specifically, decylbenzene.

The method for carrying out said test is that described in the ASTM D 1876 - 72 standards with the following two differences.

The speed for applying the load was 100 mm/minute, and the length of the specimen taken under examination for determining the value of "peeling strength" was 70 mm.

The results of the experimental tests carried out on samples of laminates not impregnated with an insulating fluid for cables were as follows:

the values of "peeling strength" for the laminate of a cable according to the invention were between 35 and 45 g/cm of width of the laminate;

the values of "peeling strength" for the laminate of a known cable was between 26 and 33 g/cm of width of the laminate.

The results of the experimental tests carried out on samples of laminates impregnated with decylbenzene (immersion time at 100° C. of the samples of laminate in decylbenzene, before carrying out the tests, for 24 hours) were as follows:

the values of "peeling strength" for the laminate of a cable according to the invention were between 11 and 20 g/cm of width of the laminate;

the values of "peeling strength" for the laminate of a known cable were between 7 and 13 g/cm of width of the laminate.

The description set forth hereinbefore is directed to a single-core oil-filled cable according to the invention wherein the layered insulation is formed wholly by turns of a tape of a laminate constituted by a polypropylene film between two thin paper layers wholly of cellulose material, but the present invention is not so limited.

In fact, the present invention is applicable to any cable in which there is one conductor, or a plurality of conductors, surrounded by a layered insulation formed by a laminate comprising a film of a polymeric material bonded to one thin paper layer or a plurality of thin paper layers where fibrils of cellulose fibers project from the surface of the thin paper layer in contact with the film of polymeric material and are embedded in the film.

Also, the present invention is applicable to cables including a laminate having the above-described characteristic, but in which the thin paper layer is not wholly constituted by a cellulose material. Instead, the thin paper layer can be constituted by compounds of cellulose fibers and fibers of polymeric material where the number of fibrils projecting from the thin paper layer and embedded in the body of the polymeric material film is at least 100 per millimeter of length of the laminate section.

From the foregoing and from the following considerations, it will be understood that the purposes previously stated are achieved by means of the cables according to the present invention.

A cable according to the present invention differs from the prior art cables which have the layered insulation formed by a laminate of the so-called "prestressed" or "extrusion bonded" type whereby the fact that fibrils of the cellulose fibers of the thin layer or layers of paper bonded to the film of polymeric material are embedded in the film.

Otherwise, the structure of a cable according to the invention, the materials and chemico-physical characteristics constituting a cable according to the invention are the same as the known cables.

The "peeling strength" experimental tests carried out on laminates of layered insulations of known cables and on laminates of layered insulations of cable according to the invention prove that with the laminate of the invention (either before or after the impregnation) the bonding between the components of the laminate is superior, on an average, by about 30% as compared to the laminates used in known cables.

It follows that the risk of suffering alterations in the correct distribution of the layered insulation is considerably reduced in the cables according to the invention with respect to the known cables because of the better bonding between the components of the laminates forming the layered insulation of the invention.

In addition, such reduction of risks of separation of the layered insulations of cables according to the invention does not involve any alteration of the chemico-physical characteristics, in particular the dielectric characteristics of the components of the laminate, since no chemico-physical alteration has been made in said components.

Consequently, in a cable according to the invention, the reduction of risks of altering the correct distribution of the layered insulation is obtained without adversely affecting the other characteristics of the cable.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. In an electric cable comprising at least one conductor, a plurality of layers of insulation encircling said conductor and a sheath encircling said layers of insulation, said layers of insulation being formed by turns of at least one laminated tape and said tape comprising at least one layer of paper containing at least cellulose fibers bonded to a tensioned film of polymeric material by melted polymer wherein the improvement comprises fibrils of said cellulose fibers extending from said fibers into, and embedded in, the polymeric material of said film.

2. An electric cable as set forth in claim 1 wherein the number of said fibrils is at least equal to 100 per millimeter of length of a section of said laminated tape.

3. An electric cable as set forth in claim 1 wherein said polymeric material is a polyolefine.

4. An electric cable as set forth in claim 3 wherein said polyolefine is polypropylene.

5. An electric cable as set forth in claim 2 wherein said polymeric material is a polyolefine.

6. An electric cable as set forth in claim 2 wherein said polyolefine is polypropylene.

7. A laminated, electric cable insulating tape comprising a film of polymeric material, at least one layer of paper tape comprising cellulose fibers bonded to said film by polymeric material of said film and fibrils of said fibers projecting from said fibers into, and embedded in, said film.

8. A laminated tape as set forth in claim 7 wherein the number of said fibrils is at least equal to 100 per millimeter of length of a section of said laminated tape.

9. A laminated tape as set forth in claim 8 wherein said film is maintained under tension by said paper tape.

10. A method of preparing a laminated electric cable, insulating tape which comprises:

subjecting a paper tape comprising cellulose fibers to an electrostatic field sufficient to raise fibrils of said fibers above a surface of said paper tape;

applying said paper tape at room temperature to a film of polymeric material at a temperature above the melting temperature thereof with said surface of said paper tape contacting a surface of said film to cause said fibrils to enter into the polymeric material of said film; and thereafter, permitting said film to cool.

11. A method as set forth in claim 10 wherein said electrostatic field and said paper tape are selected to provide at least 100 fibrils per millimeter of length of a section of said laminated tape.

12. A method as set forth in claim 11 wherein said paper tape is advanced between a pair of electrodes with an alternating voltage of at least 18 kilovolts applied thereto to provide said electrostatic field.

13. A method as set forth in claim 10 wherein said polymeric material is a polyolefine and wherein said film is heated to a temperature in the range from about 200° C. to about 320° C.

* * * * *